United States Patent
Chen (10) Patent No.: US 11,366,937 B2
(45) Date of Patent: Jun. 21, 2022

(54) MEMORY CARD LOCKING DEVICE

(71) Applicant: MAKTAR INC., New Taipei (TW)

(72) Inventor: Liang-Hsin Chen, New Taipei (TW)

(73) Assignee: MAKTAR INC., New Taipei (TW)

( * ) Notice: Subject to any disclaimer, the term of this patent is extended or adjusted under 35 U.S.C. 154(b) by 0 days.

(21) Appl. No.: 17/123,111

(22) Filed: Dec. 16, 2020

(65) Prior Publication Data
US 2022/0027521 A1 Jan. 27, 2022

(30) Foreign Application Priority Data

Jul. 27, 2020 (TW) ................................. 109125231

(51) Int. Cl.
| | |
|---|---|
| *G06F 21/00* | (2013.01) |
| *G06F 21/79* | (2013.01) |
| *G06F 13/16* | (2006.01) |
| *G06F 21/82* | (2013.01) |
| *G06F 1/26* | (2006.01) |
| *G06F 21/60* | (2013.01) |
| *G06F 12/14* | (2006.01) |

(52) U.S. Cl.
CPC .............. *G06F 21/79* (2013.01); *G06F 1/266* (2013.01); *G06F 13/1668* (2013.01); *G06F 21/602* (2013.01); *G06F 21/82* (2013.01)

(58) Field of Classification Search
CPC ........ G06F 21/79; G06F 1/266; G06F 21/602; G06F 21/82; G06F 13/1668; G06F 21/86; G06K 19/07309
See application file for complete search history.

(56) References Cited

U.S. PATENT DOCUMENTS

| | | | | |
|---|---|---|---|---|
| 6,179,205 | B1* | 1/2001 | Sloan | G07F 7/0886 902/4 |
| 7,389,123 | B2* | 6/2008 | Rydgren | H04M 3/42382 235/382 |
| 2005/0168931 | A1* | 8/2005 | Mambakkam | G06K 7/0073 361/679.4 |
| 2008/0256629 | A1* | 10/2008 | Lo | G06Q 20/3558 726/21 |
| 2011/0057033 | A1* | 3/2011 | Possanza | G06Q 10/00 235/382 |
| 2011/0060913 | A1* | 3/2011 | Hird | H04L 9/3228 713/184 |
| 2012/0080517 | A1* | 4/2012 | Braunstein | G07F 9/026 235/379 |
| 2021/0342816 | A1* | 11/2021 | Benkreira | G06Q 20/3263 |
| 2021/0385322 | A1* | 12/2021 | Poulain | H04M 1/72463 |

FOREIGN PATENT DOCUMENTS

TW M290600 U 5/2006

* cited by examiner

*Primary Examiner* — Gary S Gracia
(74) *Attorney, Agent, or Firm* — Anova Law Group, PLLC (57) ABSTRACT

A memory card locking device is provided. The memory card locking device includes an external card reader having a card slot in which a memory card is allowed to be inserted. The external card reader includes a main controller. The main controller is configured to receive a locking instruction from an application, and execute a locking program on the memory card to lock the memory card according to the locking instruction. When the memory card is locked, any device other than the external card reader cannot read and identify the memory card, and thus cannot look up and access data stored in the memory card.

6 Claims, 8 Drawing Sheets

MEMORY CARD LOCKING DEVICE

CROSS-REFERENCE TO RELATED PATENT APPLICATION

This application claims the benefit of priority to Taiwan Patent Application No. 109125231, filed on Jul. 27, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a memory card, and more particularly to a memory card locking device.

BACKGROUND OF THE DISCLOSURE

A flash memory is a non-volatile memory that has a power saving characteristic. The flash memory has a small size and does not have any mechanical structure. Therefore, the flash memory is widely used in various types of electronic devices. For example, the flash memory is used as a storage medium in a flash memory card because of the small size and a large capacity of the flash memory.

In recent times, the size of the flash memory card has become smaller and smaller, such that portability of the flash memory card is gradually increased. However, the small size of the flash memory card causes it to be easily lost, such that data in the flash memory card is easily leaked. Therefore, many encryption technologies and authentication technologies have been developed for protecting the data stored in the flash memory card. For example, a cross-authentication technology of multiple sets of passwords is applied to authenticate a password entered by a user to generate an authentication result as a basis for determining whether or not the user is given permission to access data, thereby improving security of the data.

After the flash memory cards are detected by an operating system and an operating platform of a computer, some of the flash memory cards automatically execute a password-protected program that requires the user to enter the password on the computer. However, each time the user intends to use the flash memory card, the user must first enter the password, which undoubtedly causes a high degree of inconvenience to the user. In particular, when the memory card is lost, the password may be cracked, such that the data stored in the memory card is leaked.

Generally, only a limited number of attempts for entering the password are permitted in order to protect the data. If the number of times that the user enters an incorrect password exceeds a preset value, the flash memory card is locked and cannot be unlocked anymore by entering the correct password. At this time, the user must use special software to unlock the flash memory card or even bring the flash memory card to a service store of a manufacturer of the flash memory card and request professional assistance for unlocking the flash memory card, which is very troublesome and time-consuming for the user.

SUMMARY OF THE DISCLOSURE

In response to the above-referenced technical inadequacies, the present disclosure provides a memory card locking device for a memory card. The memory card locking device includes an external card reader and a main controller. The external card reader has a card slot in which the memory card is allowed to be inserted. The main controller is configured to receive a locking instruction from an application and execute a locking program on the memory card to lock the memory card according to the locking instruction. When the memory card is locked, any device except for the external card reader cannot read and identify the memory card, and thus cannot look for and access data stored in the memory card. When the main controller executes the locking program on the memory card, the main controller locks the memory card rather than executing any encryption program on the data stored in the memory card to generate an encrypted file.

In certain embodiments, the main controller receives a state instruction from the application, and transmits state data of the memory card to the application according to the state instruction. The state data includes a connection state of the memory card to the external card reader, a locked state or an unlocked state of the memory card, a usage state and a stored data state of a storage space of the memory card, an operational state of the memory card, or any combination thereof.

In certain embodiments, the main controller receives an unlocking instruction from the application, and executes an unlocking program on the memory card to unlock the memory card according to the unlocking instruction. When the memory card is unlocked and inserted into an electronic device, the main controller allows the electronic device to read and identify the memory card, and allows data to be transmitted between the electronic device and the memory card.

In certain embodiments, the main controller receives a data accessing instruction from the application, and transmits the data stored in the memory card to the application according to the data accessing instruction.

In certain embodiments, the main controller receives a data storing instruction from the application, and transmits data of an electronic device in which the application is installed to the memory card, such that the data of the electronic device is stored in the memory card according to the data storing instruction.

In certain embodiments, the external card reader further includes a data backup module connected to the main controller. The main controller passively obtains and stores the data of the memory card according to a data transmitting instruction of the application, or automatically obtains and stores the data of the memory card.

In certain embodiments, the external card reader further includes a data backup module connected to the main controller. The main controller receives a data backuping instruction from the application and stores data from an electronic device according to the data backuping instruction.

In certain embodiments, the main controller identifies a unique identification code of the memory card. After the main controller locks the memory card by using a password, the main controller records the unique identification code and the password corresponding to the unique identification code.

In certain embodiments, the memory card includes a storage module and a storage controller. The storage controller is connected to the storage module. The storage controller is configured to control the storage module to store data and execute the locking program on the memory card according to the locking instruction.

In certain embodiments, the external card reader further includes a charging module configured to charge an electronic device when the external card reader is connected to the electronic device. The charging module is configured to be charged by an external power source when the charging module is connected to the external power source.

As described above, the present disclosure provides the memory card locking device, which includes the external card reader that locks the memory card according to the locking instruction issued by the application installed in the electronic device. Therefore, when the memory card is lost, personal private information, company confidential information and other important confidential information that are stored in the memory card cannot be leaked.

Furthermore, the external card reader that is used to execute the above-mentioned programs such as the locking program on the memory card is an external device having a small size, and not embedded in the electronic device (e.g., a computer). Therefore, the external card reader can be held conveniently by a hand of the user and carried anywhere, and is suitable for being used with the memory card and various electronic devices in which various operating systems are respectively installed. The user only needs to insert the memory card into the external card reader, without needing to manually enter the password, and the memory card is automatically locked and unlocked, which is very convenient to use.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
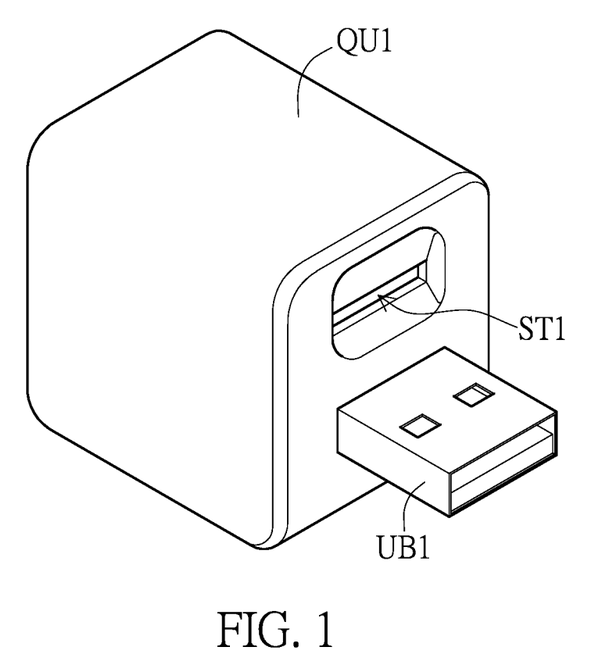
FIG. 1 is a schematic diagram of a memory card locking device according to an embodiment of the present disclosure.
Figure 2A:
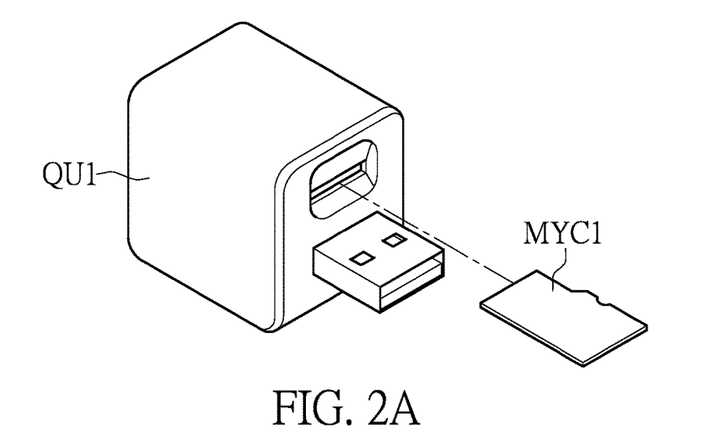
FIG. 2A is a schematic diagram of the memory card locking device and a memory card according to the embodiment of the present disclosure.
Figure 2B:
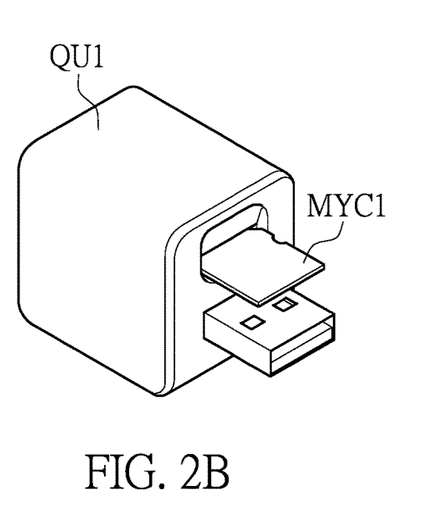
FIG. 2B is a schematic diagram showing the memory card being inserted into the memory card locking device according to the embodiment of the present disclosure.
Figure 2C:
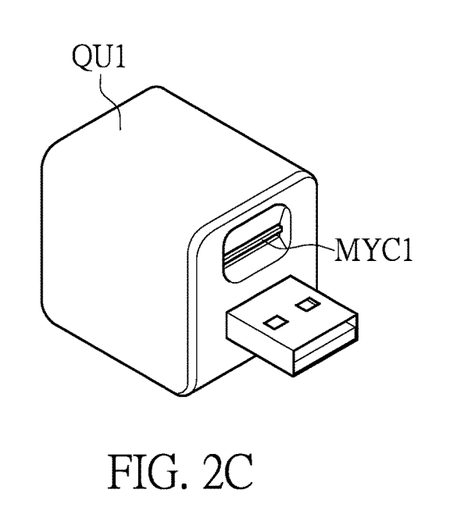
FIG. 2C is a schematic diagram showing the memory card having been inserted into the memory card locking device according to the embodiment of the present disclosure.

Reference is made to FIGS. 1, 2A, 2B and 2C, wherein FIG. 1 is a schematic diagram of a memory card locking device according to an embodiment of the present disclosure, FIG. 2A is a schematic diagram of the memory card locking device and a memory card according to the embodiment of the present disclosure, FIG. 2B is a schematic diagram of the memory card locking device into which the memory card being inserted according to the embodiment of the present disclosure, and FIG. 2C is a schematic diagram of the memory card locking device into which the memory card has been inserted according to the embodiment of the present disclosure.

In the embodiment, the memory card locking device include an external card reader QU1 shown in FIG. 1. As shown in FIG. 1, the external card reader QU1 may have a card slot ST1 and a USB connection port UB1, but the present disclosure is not limited thereto. In practice, specification, type and the number of the card slots of the external card reader and the USB connection port may be adjusted according to actual requirements.

As shown in FIGS. 1 and 2A, a memory card MYC1 is aligned with the card slot ST1 that is matched thereto. As shown in FIGS. 1 and 2B, the memory card MYC1 is gradually pushed into the card slot ST1. Finally, as shown in FIG. 2C, the memory card MYC1 is inserted into the card slot ST1.

Figure 3:
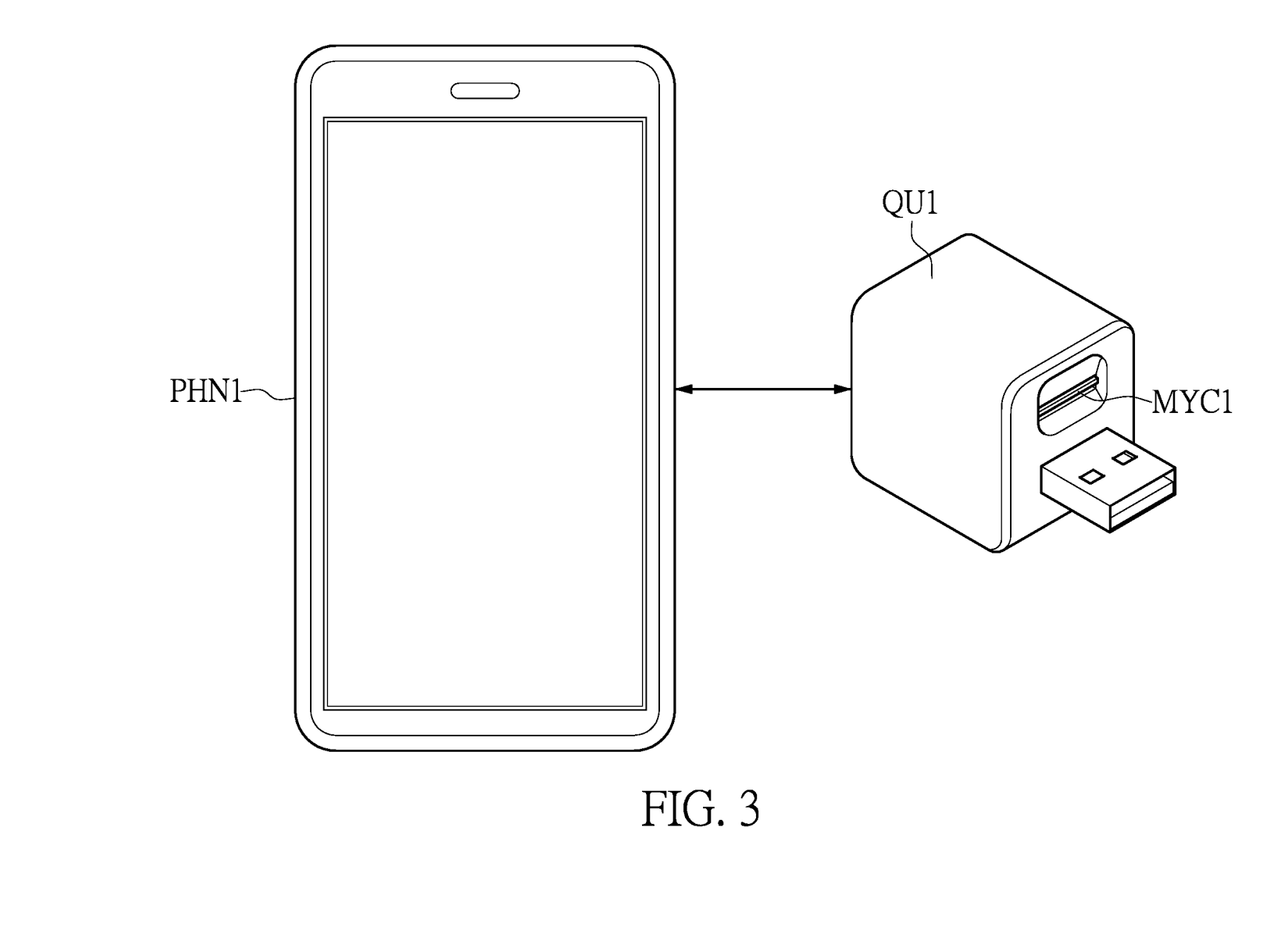
FIG. 3 is a schematic diagram of transmission between the memory card locking device and a cell phone according to the embodiment of the present disclosure.

Reference is made to FIG. 3, which is a schematic diagram of transmission between the memory card locking device and a cell phone according to the embodiment of the present disclosure.

An application may be installed in a cell phone PHN1 shown in FIG. 3. After the memory card MYC1 is inserted into to the card slot ST1 of the external card reader QU1 as shown in FIGS. 2C and 3, instructions, data, information, signals and so on may be transmitted between the external card reader QU1 and the cell phone PHN1 through the application. For example, the application of the cell phone PHN1 may issue a locking instruction to the external card reader QU1 to control the external card reader QU1 to execute a locking program on the memory card MYC1.

In practice, the cell phone PHN1 described herein may be replaced with another electronic device, and the application may be replaced with a driving program or a media or a medium that is used to bridge communications between the memory card locking device and the electronic device.

It is worth nothing that, when the external card reader QU1 executes the locking program on the memory card MYC1, the main controller does not execute any encryption program on the data stored in the memory card MYC1 and thus no encrypted file is generated. That is, the memory card MYC1 is entirety locked by the memory card locking device of the present disclosure, which is different from a conventional data encryption technology.

In detail, the conventional data encryption technology is used to encrypt data in a memory card to form an encrypted file. After the data is encrypted, the electronic device still can read and identify the memory card, and a user can look for the encrypted file in the memory card. Differently, after the memory card MYC1 is locked by the external card reader QU1 of the present disclosure, any device except for the external card reader QU1 cannot read and identify the memory card MYC1, the user cannot look for and obtain the data of the memory card MYC1, and any data cannot be transmitted to and stored in the memory card MYC1. Although the external card reader QU1 is able to read and identify the memory card MYC1, any data cannot be transmitted between the external card reader QU1 and the memory card MYC1 before the memory card MYC1 is unlocked. Therefore, when the memory card MYC1 is locked, any device except for the external card reader QU1 cannot determine whether or not any file is stored in the memory card MYC1 and cannot access data of the file stored in the memory card MYC1.

It is worth noting that, the external card reader QU1 for executing the locking program and other programs on the memory card MYC1 is an external device. For clarity and convenience of explanation, the external card reader QU1 is drawn with an enlarged scale in the figures, but the present disclosure is not limited to a size of the external card reader QU1 drawn in the figures. In practice, the external card reader QU1 has a smaller size. Furthermore, the external card reader QU1 is not embedded in the electronic device such as a computer. Therefore, the external card reader QU1 is conveniently held and carried around by the user and is suitable for electronic devices in which various operating systems are respectively installed and memory cards of a specific specification or various specifications are respectively inserted.

Figure 4:
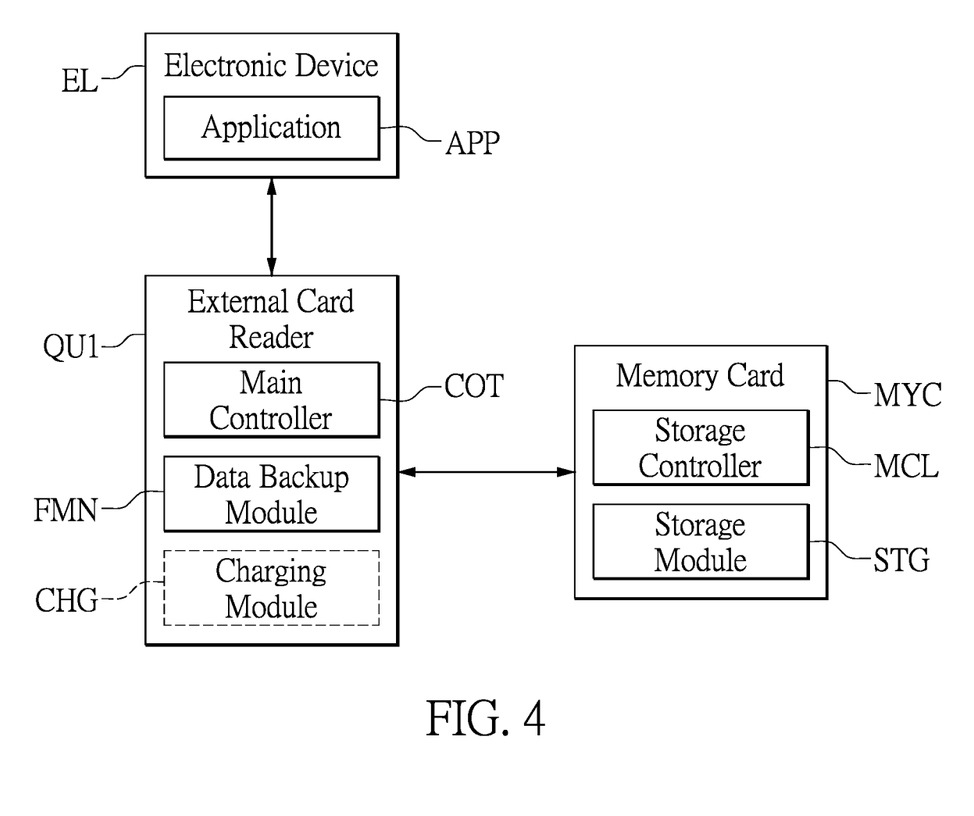
FIG. 4 is a schematic diagram of transmission between an external card reader of the memory card locking device and the memory card, and between the external card reader and an electronic device, according to the embodiment of the present disclosure.

Reference is made to FIGS. 1 to 4, wherein FIG. 4 is a schematic diagram of transmission between an external card reader of the memory card locking device and the memory card, and between the external card reader and an electronic device, according to the embodiment of the present disclosure.

As shown in FIG. 4, in the embodiment, the memory card locking device may include the external card reading device QU1. The external card reader QU1 may include a main controller COT. If necessary, the external card reader QU1 may further include a data backup module FMN, a charging module CHG or a combination thereof. Under this condition, the external card reader QU1 may have various functions such as a function of locking the memory card MYC1, a function of unlocking the memory card MYC1, a function of transmitting data to the memory card MYC1, a function of obtaining and transmitting the data of the memory card MYC1, a function of storing the data of the memory card MYC1 or other devices, a function of charging the electronic device, but the present disclosure is not limited thereto. In practice, the external card reader QU1 may be designed to have a single function or other various functions according to actual requirements.

The main controller COT of the external card reader QU1 may be connected to the data backup module FMN and the charging module CHG of the external card reader QU1. In addition, the external card reader QU1 may be connected to an electronic device EL and the memory card MYC1. For example, the electronic device EL may be the cell phone PHN1 as shown in FIG. 3. In other words, the external card reader QU1 may be connected between the electronic device EL and the memory card MYC1, and be used as a transmission medium between them.

After the memory card MYC1 is inserted into the card slot ST1 of the external card reader QU1 such that the memory card MYC1 is electrically connected to the external card reader QU1 as shown in FIG. 3, the external card reader QU1 may execute various programs on the memory card MYC1.

When the memory card MYC1 is connected to the external card reader QU1, the main controller COT may automatically or passively notify an application APP as shown in FIG. 4. Further, when the main controller COT receives a state instruction from the application APP, the main controller COT transmits present state information and/or previous state information of the memory card MYC1 to the application APP according to the state instruction. The state information of the memory card MYC1 on the application APP may be looked at, downloaded, and accessed by the electronic device EL.

The state information of the memory card MYC1 described herein may include a state that the memory card MYC1 is inserted and connected to the external card reader QU1, a state that the memory card MYC1 is unlocked or locked, a usage state and a stored data state of a storage space of the memory card MYC1, an operating state of the memory card MYC1, and so on. The usage state of the memory card MYC1 may include whether or not the memory card MYC1 stores data, an amount of the storage space that is occupied by the stored data, an amount of a remaining storage space, a storage capacity of the memory card MYC1, a content of the stored data, etc. The operating state of the memory card MYC1 may indicate that the memory card MYC1 is busy or idle.

When the memory card MYC1 is locked, the external card reader QU1 and other devices cannot look for and access the data stored in the memory card MYC1, and external data cannot be stored in the memory card MYC1.

Therefore, when the main controller COT of the external card reader QU1 determines that the memory card MYC1 is locked, the main controller COT may notify the application APP such that the application APP issues an unlocking instruction. The main controller COT executes an unlocking program on the memory card MYC1 to unlock the memory card MYC1 according to the unlocking instruction. After the memory card MYC1 is unlocked, the electronic device EL into which the memory card MYC1 is inserted can read and identify the memory card MYC1, and data, information, messages, instructions can then be transmitted between the memory card MYC1 and the electronic device EL.

It should be understood that, when the main controller COT of the external card reader QU1 determines that the memory card MYC1 is already in an unlocked state, the above-mentioned unlocking program does not need to be executed.

The memory card MYC1 may include a storage module STG and a storage controller MCL. For example, the memory card MYC1 may be a secure digital (SD) memory card, and the storage module STG may be a flash memory, but the present disclosure is not limited thereto. The storage controller MCL is connected to the storage module STG. The storage controller may control the storage module STG to store data. In addition, the storage controller may execute the locking program on the memory card MYC1 according to the locking instruction, or execute the unlocking program on the memory card MYC1 according to the unlocking instruction.

When the memory card MYC1 is in the unlocked state, the application APP may issue a data accessing instruction to the main controller COT of the external card reader QU1. The main controller COT may obtain the data stored in the memory card MYC1 and transmit the data of the memory card MYC1 to the application APP or data of the electronic device EL according to the data accessing instruction. As a result, the data of the memory card MYC1 may be displayed on the application APP or on a display screen of the electronic device EL such that a user can look for, modify and share the data. If necessary, the main controller COT may transmit the data of the memory card MYC1 to the application APP such that the data is stored in the application APP or to a storage unit of the electronic device EL. For example, the storage unit may be a random access memory, a memory cell of a solid state drive or a flash memory, but the present disclosure is not limited thereto.

The following transmissions have a transmission direction that is opposite to the above-mentioned transmission direction. Specifically, when the memory card MYC1 is in the unlocked state, the application APP may issue a data storing instruction to the main controller COT of the external card reader QU1. The data of the electronic device EL or the data of the application APP may be transmitted to the external card reader QU1 from the electronic device EL or the application APP. The main controller COT of the external card reader QU1 may transmit the data of the electronic device EL or the data of the application APP to the memory card MYC1 such that the memory card MYC1 stores the data according to the data store instruction.

The external card reader QU1 shown in FIG. 4 may not only be used as a transmission medium between the electronic device EL and the memory card MYC1, but also used as a storage media of the data of the electronic device EL and the memory card MYC1.

As shown in FIG. 4, the external card reader QU1 may further include the data backup module FMN. The data backup module FMN may be connected to the main controller COT.

When the main controller COT of the external card reader QU1 receives a data transmitting instruction from the application APP, the main controller COT passively obtains the data stored in the memory card MYC1 and controls the data backup module FMN of the external card reader QU1 to store the data according to the data transmitting instruction.

Alternatively, when the main controller COT detects that the memory card MYC1 is inserted into the card slot ST1 of the external card reader QU1, and then identifies the memory card MYC1, but does not receive any instruction from the application APP, the main controller COT may automatically obtain the data stored in the memory card MYC1 and control the data backup module FMN of the external card reader QU1 to store the data.

In addition to the data of the memory card MYCL data from other sources may be backed up. For example, the main controller COT of the external card reader QU1 may receive the data of the electronic device EL and a data backuping instruction for instructing to store the data, from the application APP. Under this condition, the main controller COT controls the data backup module FMN of the external card reader QU1 to store the data of the electronic device EL according to the data backuping instruction.

In addition, the external card reader QU1 may have a charging function. In detail, the external card reader QU1 may include a charging module CHG When the electronic device EL is wiredly or wirelessly connected to the external card reader QU1, the electronic device EL such a cell phone may be charged by the external card reader QU1. If necessary, the data may be transmitted between the electronic device EL and the external card reader QU1 at this time.

Figure 5:
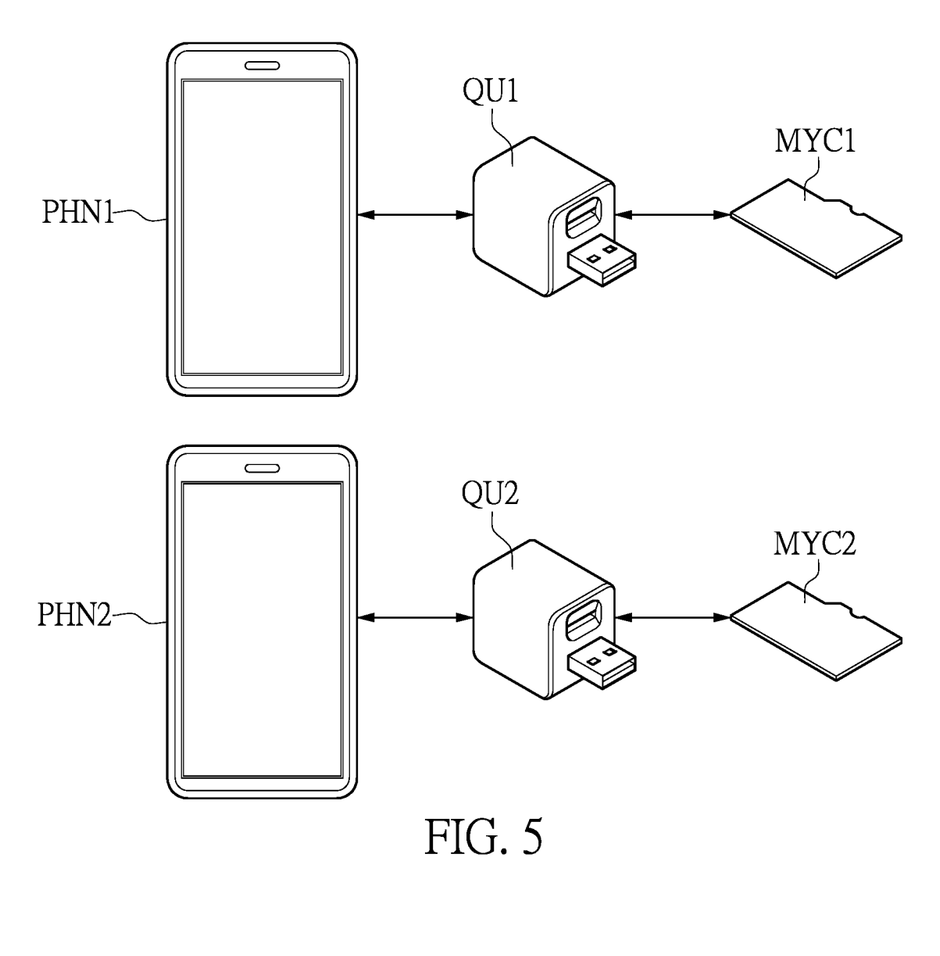
FIG. 5 is a schematic diagram of transmission between a plurality of external card readers of the memory card locking device and the correspondingly matched memory cards, and between the external card readers and the correspondingly matched electronic devices, according to an embodiment of the present disclosure.

Reference is made to FIG. 5, which is a schematic diagram of transmission between a plurality of external card readers of the memory card locking device and the matched memory cards, and between the external card readers and the matched electronic devices, according to an embodiment of the present disclosure.

As shown in FIG. 5, in the embodiment, the memory card locking device may include a plurality of external card readers QU1 and QU2 that are respectively matched with cell phones PHN1 and PHN2. In practice, the cell phones PHN1 and PHN2 may be replaced with other types of mobile devices, or other portable or non-portable electronic devices. The external card readers QU1 and QU2 are respectively used to execute programs on the memory cards MYC1 and MYC2.

In the embodiment, a one-to-one transmission and control manner is used, but the present disclosure is not limited thereto. In addition, the number, the types, the transmission manners and the control manners of the external card reader, the cell phone and the memory card are only exemplified in the embodiment, and the present disclosure is not limited thereto.

After the external card reader QU1 is connected to the memory card MYC1 as shown in FIGS. 2C and 3, the application may automatically issue the instructions to the external card reader QU1. Alternatively, the user uses the application of the cell phone PHN1 shown in FIG. 5 to issue the instructions to the external card reader QU1. For example, the user clicks page options of the application displayed on a touch screen of the cell phone PHN1 to issue the above-mentioned or other instructions through the application.

Similarly, after the external card reader QU2 is connected to a memory card MYC2, the user may click page options of the application displayed on a touch screen of the cell phone PHN2 to issue the instructions such as the above-mentioned or other instructions through the application.

Figure 6:
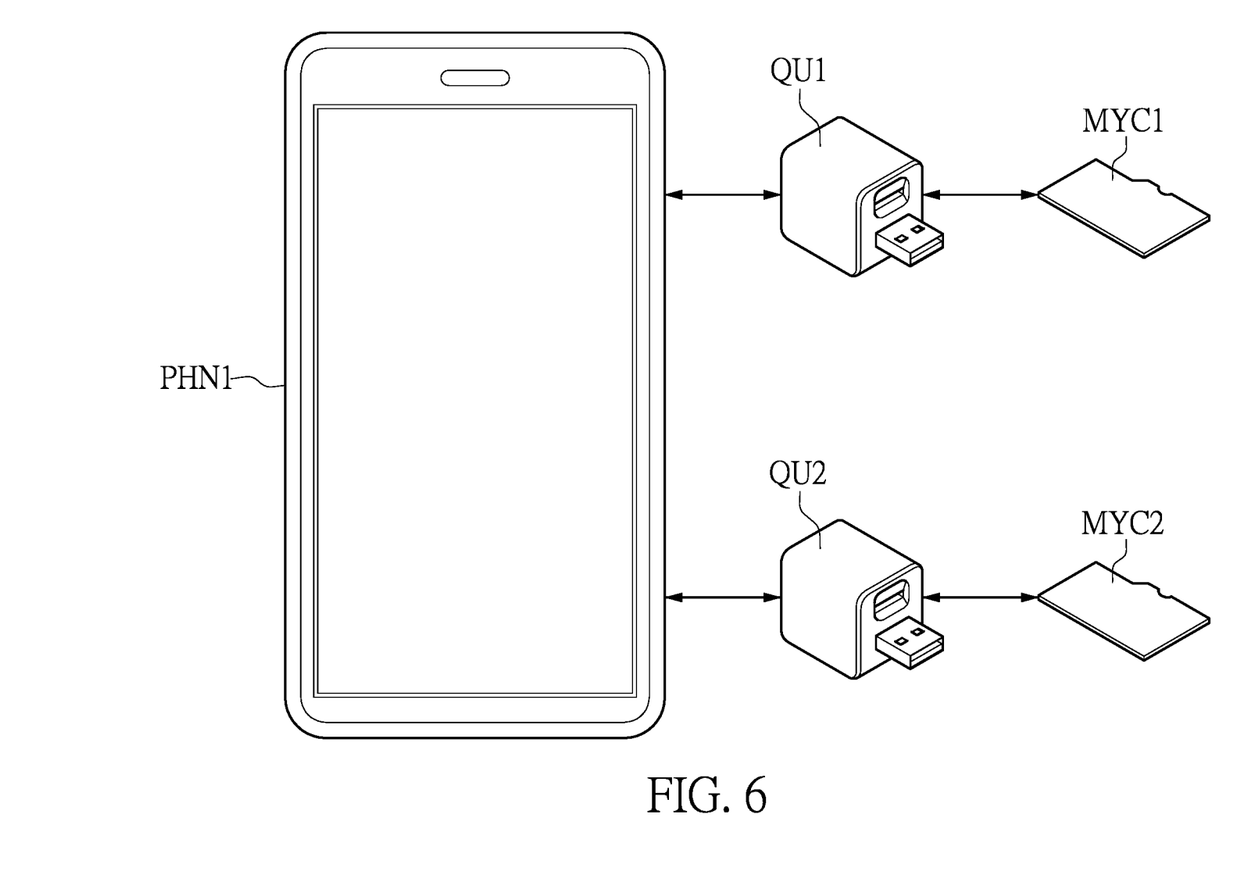
FIG. 6 is a schematic diagram of the plurality of external card readers of the memory card locking device that respectively lock memory cards according to instructions from a single electronic device according to an embodiment of the present disclosure.

Reference is made to FIG. 6, which is a schematic diagram of the plurality of external card readers of a memory card locking device that respectively lock memory cards according to instructions from a single electronic device according to an embodiment of the present disclosure.

As shown in FIG. 6, in the embodiment, the memory card locking device may include the external card readers QU1 and QU2 that are matched with the cell phone PHN1. In practice, the cell phone PHN1 may be replaced with other types of mobile devices, or other portable or non-portable electronic devices. The external card readers QU1 and QU2 are respectively used to execute programs on the memory cards MYC1 and MYC2.

A difference between the embodiments of FIGS. 5 and 6 is that, a one-to-many transmission and control manner is used in the embodiment of FIG. 6, but the present disclosure is not limited thereto.

Specifically, the application may only be installed in the cell phone PHN1 shown in FIG. 6. The cell phone PHN1 may issue the above-mentioned instructions synchronously or asynchronously to the external card readers QU1 and QU2 through the application to instruct the external card readers QU1 and QU2 to execute corresponding programs respectively on the memory cards MYC1 and MYC2.

Figure 7:
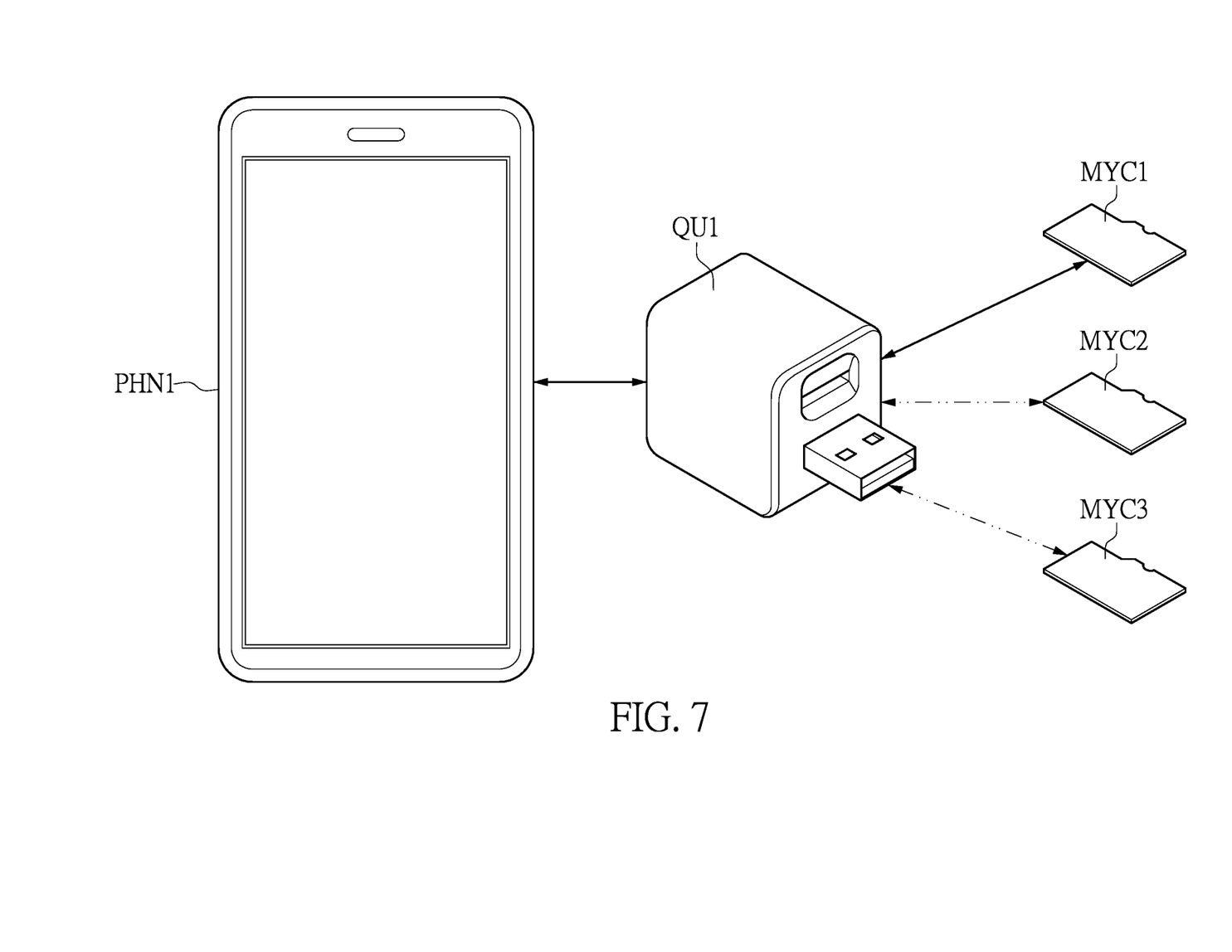
FIG. 7 is a schematic diagram of one external card reader of the memory card locking device for locking one of a plurality of memory cards that is inserted into the external card reader according to an instruction of the electronic device according to an embodiment of the present disclosure.

Reference is made to FIG. 7, which is a schematic diagram of one external card reader of a memory card locking device for locking one of a plurality of memory cards that is inserted into the external card reader according to an instruction of the electronic device according to an embodiment of the present disclosure.

As shown in FIG. 7, the memory card locking device may include the external card reader QU1. In the embodiment, the external card reader QU1 is suitable for a plurality of memory cards MYC1, MYC2, MYC3. The memory cards MYC1, MYC2, MYC3 may be alternatively inserted into the card slot ST1 of the external card reader QU1 shown in FIGS. 1 and 7. In practice, the external card reader QU1 may have a plurality of the same type or different types of card slots such that the memory cards MYC1, MYC2, MYC3 can be respectively inserted into the plurality of card slots at the same time.

The application of the cell phone PHN1 may issue a plurality of instructions such that the locking instruction, the unlocking instruction, the data accessing instruction, the data storing instruction, the data transmitting instruction or the data backuping instruction as described above or other instructions can instruct the single external card reader QU1 to execute the locking program, the unlocking program, the data transmitting program, the data storing program or other programs synchronously or asynchronously on the memory cards MYC1, MYC2, MYC3.

In detail, when the memory cards MYC1, MYC2, MYC3 are inserted into and connected to the external card reader QU1, the main controller of the external card reader QU1 may identify a unique identification code of each of the memory cards MYC1, MYC2, MYC3. After the memory cards MYC1, MYC2, MYC3 are locked respectively by using the same password or different passwords, the main controller of the external card reader QU1 may record the unique identification codes of the memory cards MYC1, MYC2, MYC3 and the passwords.

After the memory cards MYC1, MYC2, MYC3 are removed from the external card reader QU1, the memory cards MYC1, MYC2, MYC3 may be connected to the external card reader QU1 again. At this time, the main controller may identify the unique identification code of each of the memory cards MYC1, MYC2, MYC3 and unlock each of the memory cards MYC1, MYC2, MYC3 by using the password corresponding to the unique identification code.

After each of the memory cards MYC1, MYC2, MYC3 is unlocked, the data of the electronic device or the data of the external card reader QU1 may be transmitted to each of the memory cards MYC1, MYC2, MYC3 for storing the data, or the data stored in each of the memory cards MYC1, MYC2, MYC3 may be transmitted and accessed.

After the data transmitting program and the data storing program are executed, the application may automatically or manually issue the locking instruction by the user to instruct the main controller of the external card reader QU1 to lock each of the memory cards MYC1, MYC2, MYC3 again by using the original password or a new password.

Figure 8:
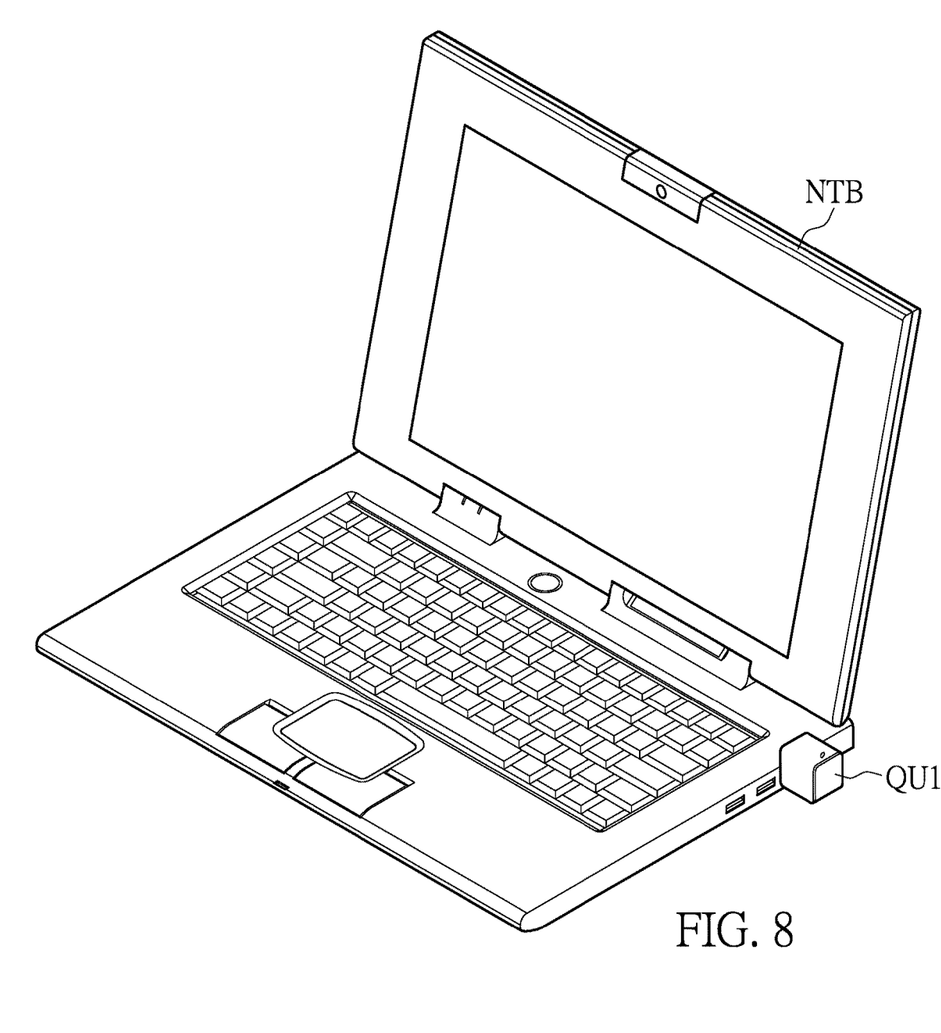
FIG. 8 is a schematic diagram of the memory card locking device in which the memory card is inserted and to which a laptop is connected according to an embodiment of the present disclosure.

Reference is made to FIGS. 1 to 8, wherein FIG. 8 is a schematic diagram of the memory card locking device in which the memory card is inserted and to which a laptop is connected according to an embodiment of the present disclosure.

In the embodiment, the memory card locking device may include the external card reader QU1 shown in FIG. 8. The external card reader QU1 shown in FIG. 8 may have the USB connection port UB1 shown in FIG. 1. The USB connection port UB1 of the external card reader QU1 may be plugged into a connection port of the electronic device such as a laptop NTB as shown in FIG. 8, and the memory card MYC1 may be inserted into the card slot ST1 of the external card reader QU1 as shown in FIG. 2C.

It should be understood that, the memory card locking device QU1, the memory card MYC1 and the notebook NTB may be connected to each other in other manners, and the present disclosure is not limited to the manner exemplified in the embodiment of FIG. 8. In practice, the external card reader QU1 may have a USB slot. One terminal of a data transmission wire (that may only have a data transmission function) or one terminal of a data transmission/charging wire (that has data transmission and charging functions) is inserted into the USB slot of the external card reader QU1. The other terminal of the data transmission wire or the data transmission/charging wire is inserted into a USB slot of the laptop NTB. As a result, the memory card locking device QU1 is connected to the laptop NTB.

A driving program of the memory card locking device QU1 may be installed in the laptop NTB or other electronic devices in advance. When the memory card locking device QU1 is connected to the laptop NTB, the driving program of the laptop NTB may issue instructions to the memory card locking device QU1. The instructions may include the locking instruction, the unlocking instruction, the data accessing instruction, the data storing instruction, the data transmitting instruction and the data backuping instruction as described above. As a result, the locking program, the unlocking program, the data transmitting program and the data storing program may be respectively executed on the memory card MYC1.

If necessary, the external card reader QU1 may have a charging module CHG The charging module CHG may be connected to an external power source or the electronic device such as the laptop NTB shown in FIG. 8, or an extension cord socket in practice. Under this condition, the charging module CHG may be charged by the external power source or the electronic device, or the electronic device may be charged by the charging module CHG In summary, the present disclosure provides the memory card locking device, which includes the external card reader that locks the memory card according to the locking instruction issued by the application installed in the electronic device. Therefore, when the memory card is lost, personal private information, company confidential information and other important confidential information that are stored in the memory card cannot be leaked.

Furthermore, the external card reader that is used to execute the above-mentioned programs such as the locking program on the memory card is an external device having a small size, and not embedded in the electronic device such as the computer. Therefore, the external card reader can be held conveniently by a hand of the user and carried anywhere, and is suitable for the memory card and various electronic devices in which various operating systems are respectively installed. The user only needs to insert the memory card into the external card reader, but not manually enter the password, the memory card is automatically locked and unlocked, which is very convenient to use.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A memory card locking device for a memory card, comprising:
an external card reader having a card slot in which the memory card is allowed to be inserted and including:
a main controller, wherein, when the main controller receives a locking instruction from an application, the main controller executes a locking program on the memory card to lock the memory card according to the locking instruction, any device other than the external card reader is unable to read and identify the memory card being locked, so as to be unable to look up and access data stored in the memory card, and when the main controller receives an unlocking instruction from the application, the main controller executes an unlocking program on the memory card to unlock the memory card according to the unlocking instruction; and
a charging module configured to charge an electronic device when the external card reader is connected to the electronic device, and configured to be charged by an external power source when the charging module is connected to the external power source;
wherein, when the memory card inserted into the card slot of the external card reader is unlocked and the main controller of the external card reader receives a data accessing instruction from the application, the main controller, according to the data accessing instruction, transmits the data stored in the memory card to the application such that the data of the memory card is stored in the application, or transmits the data of the memory card to the electronic device such that the data of the memory card is displayed on a display screen of the electronic device and stored in a storage unit of the electronic device;
wherein, when the memory card inserted into the card slot of the external card reader is unlocked and the main controller of the external card reader receives a data storing instruction from the application, the main controller transmits data of the electronic device or data of the application to the memory card according to the data storing instruction such that the memory card stores the data of the electronic device or the data of the application;
wherein, when the main controller executes the locking program on the memory card, the main controller locks the memory card, without executing any encryption program on the data stored in the memory card and generating an encrypted file.

2. The memory card locking device according to claim 1, wherein the main controller receives a state instruction from the application, and transmits state data of the memory card to the application according to the state instruction, and the state data includes a connection state of the memory card to the external card reader, a locked state or an unlocked state of the memory card, a usage state and a stored data state of a storage space of the memory card, an operational state of the memory card, or any combination thereof.

3. The memory card locking device according to claim 1, wherein the external card reader further includes a data backup module connected to the main controller, and the main controller passively obtains and stores the data of the memory card according to a data transmitting instruction of the application, or automatically obtains and stores the data of the memory card.

4. The memory card locking device according to claim 1, wherein the external card reader further includes a data backup module connected to the main controller, and the main controller receives a data backuping instruction from the application, and stores data from the electronic device according to the data backuping instruction.

5. The memory card locking device according to claim 1, wherein the main controller identifies a unique identification code of the memory card, and after the main controller locks the memory card by using a password, the main controller records the unique identification code and the password corresponding to the unique identification code.

6. The memory card locking device according to claim 1, wherein the memory card includes a storage module and a storage controller, the storage controller is connected to the storage module, and the storage controller is configured to control the storage module to store data and execute the locking program on the memory card according to the locking instruction.

* * * * *